(12) United States Patent
Li

(10) Patent No.: US 11,697,859 B2
(45) Date of Patent: Jul. 11, 2023

(54) MANUAL TOOL AND METHOD FOR MANUFACTURING THE SAME

(71) Applicants: HANGZHOU UNITED TOOLS CO., LTD., Hangzhou (CN); HANGZHOU GREAT STAR INDUSTRIAL CO., LTD., Hangzhou, CA (US)

(72) Inventor: Yueming Li, Hangzhou (CN)

(73) Assignees: HANGZHOU UNITED TOOLS CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 857 days.

(21) Appl. No.: 16/465,086

(22) PCT Filed: Nov. 6, 2017

(86) PCT No.: PCT/CN2017/109574
§ 371 (c)(1),
(2) Date: May 29, 2019

(87) PCT Pub. No.: WO2019/084965
PCT Pub. Date: May 9, 2019

(65) Prior Publication Data
US 2019/0292620 A1 Sep. 26, 2019

(51) Int. Cl.
*C21D 9/32* (2006.01)
*C21D 9/00* (2006.01)
(Continued)

(52) U.S. Cl.
CPC .......... *C21D 9/32* (2013.01); *B25B 7/02* (2013.01); *B25B 13/462* (2013.01); *B25B 15/04* (2013.01); *C21D 9/0068* (2013.01)

(58) Field of Classification Search
CPC .......... C21D 9/32; C21D 9/0068; B25B 7/02; B25B 13/462; B25B 15/04
See application file for complete search history.

(56) References Cited

U.S. PATENT DOCUMENTS 5,906,053 A * 5/1999 Turner .................... C21D 9/18
30/353
6,327,943 B1 * 12/2001 Wrigley .................. B25B 7/02
81/421

FOREIGN PATENT DOCUMENTS

| CN | 1328902 A | 1/2002 |
| CN | 203680154 U | 7/2014 |
| EP | 2148551 A1 | 1/2010 |

OTHER PUBLICATIONS

Wolfgang R. Schwenk, Simultaneous Dual-Frequency Induction Hardening, Apr./May 2003, Eldec Induction U.S.A. Inc, pp. 35-38 (Year: 2003).*

(Continued)

*Primary Examiner* — Seahee Hong
(74) *Attorney, Agent, or Firm* — Fitch, Even, Tabin & Flannery LLP

(57) ABSTRACT

The present invention discloses a method for manufacturing a manual tool, comprising: performing dual-frequency induction quenching on a first surface of a moment output part or a moment transmission part of the manual tool such that a quench-hardened layer is formed within a first depth range from the first surface of the moment output part to the interior of the moment output part or within a first depth range from the first surface of the moment transmission part to the interior of the moment transmission part, the hardness of the quench-hardened layer being higher than that of the body of the moment output part or the moment transmission part; the dual-frequency induction quenching being configured to simultaneously feed or introduce a high-frequency current and an intermediate-frequency current to the same induction coil to simultaneously heat the first surface of the moment output part or the first surface of the moment transmission part by the high-frequency current and the intermediate-frequency current, and then the moment output (Continued)

part or the moment transmission part being cooled and quenched. The present invention also discloses a manual tool manufactured by the above method. The manual tool subjected to double-frequency induction quenching according to the present invention has good abrasion resistance.

6 Claims, 11 Drawing Sheets

(51) Int. Cl.
*B25B 7/02* (2006.01)
*B25B 13/46* (2006.01)
*B25B 15/04* (2006.01)

(56) References Cited

OTHER PUBLICATIONS

PCT; App. No. PCT/CN2017/109574; International Search Report and Written Opinion dated Apr. 20, 2018.
Zhang, Po.; "SDF Synchronous double-frequency induction technology and its applications in the automotive parts and components heat treatment"; MW Metal Forming, No. 5; pub. Mar. 2010; pp. 17-20.

* cited by examiner

MANUAL TOOL AND METHOD FOR MANUFACTURING THE SAME

CROSS-REFERENCE TO RELATED APPLICATIONS

This application is a U.S. national phase application of International Application No. PCT/CN2017/109574, filed Nov. 6, 2017, designating the United States.

FIELD OF THE INVENTION

The present invention relates to a manual tool and a method for manufacturing the same.

DESCRIPTION OF THE PRIOR ART

Most of traditional water pump pliers, pipe pliers, locking pliers and other pliers tools adopt overall carbon steel and alloy steel as the matrix, and are subjected to blanking cutting, hot forging, machining, overall heat treatment for property adjustment, single high-frequency induction quenching of the tooth part, assembly, packaging and then shipping.

Under normal circumstances, the pliers head of the water pump pliers, pipe pliers, locking pliers and other pliers hardware tools need to go through heat treatment twice. The first is overall heat treatment for property adjustment (i.e., quenching+high temperature tempering) after the pliers head is hot forged so that the pliers head obtains better strength and toughness and will not be broken during actual use. The second is the second high-frequency induction quenching of the tooth part so that the tooth part obtains a higher hardness and wear resistance, increasing the service life of these pliers tools.

Traditionally, the high-frequency induction quenching of the tooth parts of the pliers tools such as water pump pliers, pipe pliers, locking pliers, etc. mostly use a single-frequency induction current, that is, the induction coil always is supplied with one constant frequency current when the high-frequency induction device is working. The advantages of this method are single equipment and simple operation. However, due to the non-circular symmetrical surface of the tooth part of the pliers, the shape is complicated, the single-frequency induction heating cannot effectively heat and quench the entire tooth part section simultaneously, bringing a greater risk to the high-frequency quenching quality of the tooth part. When the high-frequency heating time is short, only the sharp portions on both sides of a tooth of the pliers may be heated and quench-hardened, while the middle portion of the tooth is not heated sufficiently, so that the hardness of the middle part of the tooth after being cooled and quenched is insufficient. During actual use (such as clamping a pipe), the middle part of the tooth is easy to wear and collapse, resulting in the entire product scrapped. In order to improve the defect of insufficient quenching of the middle part of the tooth of the pliers, when the high-frequency heating time is increased, most of the area including the whole pliers head is heated and quench-hardened. Although all tooth faces of the pliers are quench-hardened, most of the pliers head below the tooth are also in a high hardness state and have a high degree of brittleness. Therefore, the pliers head is prone to breakage during use.

To overcome the above shortcomings, some manufacturers try to use two induction quenching devices with different frequencies (correspondingly, two induction coils) to sequentially heat, cool and quench the tooth part of the pliers head of the water pump pliers, pipe wrenches, locking pliers, looking forward to solving the above problems. That is, the root of the tooth of the pliers head and the portion below the root are preheated with the intermediate-frequency induction device (correspondingly, the induction coil is energized with an intermediate-frequency current), and immediately then the convex portion of the tooth surface of the pliers head is heated with a high-frequency induction device (correspondingly, the induction coil is energized with a high-frequency current), and then cooled and quenched subsequently. This production mode can improve the quenching quality of the tooth of the pliers to a certain extent, but the defects are also obvious. For example, two devices occupy a large footprint; the workpiece needs to be quickly transferred between the two induction heating devices, which involves multiple workpiece loading, unloading and clamping, and thus the heating and quenching quality is instable; the heating time is long, the workpiece is easily oxidized; and there are many process steps, the production period is long, and the production cost is too high.

For silent ratchet wrenches, the D-head is its core part. According to the design principle, it is generally desired that the hardness of the hexagonal working face of the D-head is higher and the wear resistance is good, at the same time, it is desired that the hardness of the core portion of the hexagonal head of the D-head and the quadrangular working faces of the D-head is lower, the toughness is good, and breakage will not occur easily during actual use. But traditionally, D-head adopts overall heat treatment, and its hexagonal working face and quadrangular working faces are within the same hardness range. When the overall hardness is higher, the hexagonal face has good wear resistance and works properly, but the quadrangular face is easy to break; when the overall hardness is lower, the quadrangular face has good toughness and works properly, but the hexagonal face is easy to wear. To overcome the above shortcomings, some manufacturers try to perform high-frequency quenching on the hexagonal working face of the D-head with a single frequency. However, due to the skin effect of high-frequency heating, the six side edges of the hexagonal working face can easily be overheated, which leads to overheating of the side edge parts and the reduction of strength and wear resistance.

For F-clip products, an iron lever is its core components. According to the design principle, the upper and lower working faces of the iron lever need a higher hardness, and the core portion maintains a lower hardness. Traditionally, however, heat treatment production of the iron lever adopts single-frequency induction quenching. When the heating time is shorter, the depth of the quench-hardened layer on the upper and lower faces of the iron lever is less than the design depth, and the quench-hardened depths of the upper and lower working faces of the iron lever are quite different, which affects the use effect of the F-clip. When the heating time is longer, the quench-hardened layer on the upper and lower faces of the iron lever can reach the designed depth, but the iron lever is seriously deformed and cannot be straightened, resulting in the product being scrapped.

For a zero-degree dual-purpose wrench, ratchet ring is its core part, which has a smaller wall thickness. According to the design principle, the outer surface of the ratchet ring needs higher hardness and higher abrasion resistance. Traditionally, the ratchet ring generally adopts alloy structural steel and tool steel as the matrix, and is subjected to machining, overall property adjustment and then surface chemical processing to improve the surface hardness of the ratchet ring (the surface heat treatment includes but is not limited to carburizing, nitriding, carbonitriding, etc.), but the problems that the carburizing depth is not easy to control and the product is deformed occur easily. Or, the ratchet ring adopts partial tool steel and bearing steel as the matrix and is subjected to machining and overall heat treatment, obtaining a high hardness state. However, the defects of the process method are that the overall hardness of the ratchet ring product is too high and the brittleness is large, and the ratchet ring is easily broken during actual use.

Ratchet and pawl are core parts of ratchet screwdrivers. Ring gear, sun gear, and planetary gear are core parts of acceleration screwdrivers. According to the design principle, the outer surfaces of the ratchet, pawl, ring gear, sun gear, planet gear and other parts require a higher hardness to ensure the surface wear resistance of the transmission parts; and the interior of the ratchet, pawl, ring gear, sun gear, planetary gear requires a lower hardness so as to maintain the toughness of the transmission parts, and thus breakage will not occur easily during service. Traditionally, the ratchet, pawl, ring gear, sun gear and planet gear generally adopt iron-based powder metallurgy parts or adopt carbon steel, alloy structural steel and tool steel as the matrix and are subjected to powder metallurgy sintering or machining and overall quenching, tempering. When the ratchet, pawl, ring gear, sun gear, and planetary gear, etc. have an overall higher hardness, the surface wear resistance is good, but the components are brittle and easy to break; when the ratchet, pawl, ring gear, sun gear, planetary gear, etc. have an overall lower hardness, the component toughness is good, but the outer surface of the components is lack of wear resistance.

Therefore, how to improve the quenching quality and hardness distribution of the tooth of the pliers, the hexagonal head of the ratchet wrench, the lever of the F-clip, the ratchet ring of the silent ratchet wrench, the ratchet, the pawl of the ratchet screwdriver, the ring gear, the sun gear and the planetary gear of the acceleration screwdriver and thus enhance use experience of the product has become a very meaningful attempt.

SUMMARY OF THE INVENTION

The technical problem to be solved by the present invention is to provide a method for improving the quenching quality and hardness distribution of a moment output part of a manual tool, such as a tooth of a pliers tool, a hexagonal head of a ratchet wrench, a lever of an F-clip, a ratchet ring of a silent ratchet wrench, a ratchet and pawl of a ratchet screwdriver, and a ring gear, sun gear, planetary gear of an acceleration screwdriver.

In order to solve the above technical problem, according to a first aspect of the present invention, there is provided a method for manufacturing a manual tool, comprising the steps of:

providing a metal raw material;

processing and shaping the metal raw material according to the requirements of a manual tool such that the manual tool has a moment output part for directly or indirectly exerting a force on a workpiece or a moment transmission part for transmitting a moment;

performing dual-frequency induction quenching on a first surface of the moment output part or a first surface of the moment transmission part such that a quench-hardened layer is formed within a first depth range from the first surface of the moment output part to the interior of the moment output part or within a first depth range from the first surface of the transmission part to the interior of the moment transmission part, the quench-hardened layer having a higher hardness than that of the body of the moment output part or the moment transmission part;

wherein the dual-frequency induction quenching is configured to simultaneously feed or introduce a high-frequency current and an intermediate-frequency current to the same induction coil, the first surface of the moment output part or the first surface of the moment transmission part is simultaneously heated by the high-frequency current and the intermediate-frequency current, and then the moment output part or the moment transmission part is cooled and quenched.

Further, the first depth is 0.3 to 8.0 mm, preferably 0.6 to 3.0 mm.

Further, the dual-frequency induction quenching is such that a transition zone is formed between the quench-hardened layer and the body of the moment output part, the hardness of the transition zone being lower than that of the body of the moment output part and not higher than that of the quench-hardened layer.

Further, after the first surface of the moment output part is subjected to dual-frequency induction quenching, the body of the moment output part maintains the original hardness unchanged except for the quench-hardened layer and the transition zone.

Further, the dual-frequency induction quenching is such that a transition zone is formed between the quench-hardened layer and the body of the moment transmission part, the hardness of the transition zone being lower than that of the body of the moment transmission part and not higher than that of the quench-hardened layer.

Further, after the first surface of the moment transmission part is subjected to dual-frequency induction quenching, the body of the moment transmission part maintains the original hardness unchanged except for the quench-hardened layer and the transition zone.

Further, the first surface of the moment output part or the first surface of the moment transmission part is heated using an induction heating device that includes an induction coil.

Further, in the induction heating device, the high-frequency current has a frequency range of 100-500 KHz and a power range of 5-1500 KW.

Further, in the induction heating device, the intermediate-frequency current has a frequency range of 0.2 to 25 KHz and a power range of 5-1500 KW.

Further, the medium used for cooling and quenching is quenching oil or a PAG water-soluble quenching medium, wherein the main composition of the PAG water-soluble quenching medium is a polyalkylene glycol polymer, and the polyalkylene glycol is a copolymer of ethylene oxide and propylene oxide, referred to as PAG.

Further, the manufacturing method further includes tempering the manual tool after dual-frequency induction quenching at a tempering temperature of 160-400° C. for a temperature-holding time of 2-8 hours.

Further, the metal raw material is a powder metallurgy material, carbon steel, alloy structural steel or tool steel raw material.

Further, the manual tool is a pliers tool, wrench, clamp or screwdriver, and the like, which is driven through a toothed structure.

The formation process of the quench-hardened layer and the transition zone in the manual tool of the present invention is as follows:

In a dual-frequency quenched workpiece, a dual-frequency quench-hardened layer, a transition zone and a matrix are distributed in this order from outside to inside, with the quench-hardened layer and the transition zone formed simultaneously. In actual dual-frequency quenching, the heating temperature of the workpiece surface exceeds the phase transition temperature of the material, a martensite is formed in the subsequent rapid quenching, the hardness is increased, and a dual-frequency quench-hardened zone is formed; the heating temperature of a shallow region inward from the dual-frequency quench-hardened layer has not yet reached the phase transition temperature of the material, but exceeds the tempering temperature of the material, which is in fact a tempering process, so the hardness is decreased and a transition zone is formed; further inward, the heating temperature of the material declines sharply and does not reach the tempering temperature of the material, the hardness remains unchanged, i.e., the matrix. In practice, the narrower the thickness of the transition zone is, the better it will be.

According to a second aspect of the present invention, there is provided a manual tool comprising at least a moment output part or a moment transmission part. A quench-hardened layer is formed within a first depth range from a first surface of the moment output part to the interior of the moment output part or within a first range from a first surface of the moment transmission part to the interior of the moment transmission part. The formation process of the quench-hardened layer is: the first surface of the moment output part or the moment transmission part is simultaneously heated by the high-frequency current and the intermediate-frequency current fed in or introduced in the same induction coil, and then the moment output part or the moment transmission part is cooled and quenched.

Further, the hardness of the quench-hardened layer is higher than that of the body of the moment output part or the moment transmission part.

Further, the first depth is 0.3 to 8.0 mm, preferably 0.6 to 3.0 mm.

Further, a transition zone is formed between the quench-hardened layer and the body of the moment output part, the hardness of the transition zone being lower than that of the quench-hardened layer and not higher than that of the body of the moment output part.

Further, the dual-frequency induction quenching is such that a transition zone is formed between the quench-hardened layer and the body of the moment transmission part, the hardness of the transition zone being lower than that of the body of the moment transmission part and not higher than that of the quench-hardened layer.

Further, the depth of the transition zone is not greater than 3.0 mm, preferably not greater than 1.5 mm.

Further, the contact face between the transition zone and the quench-hardened layer extends along the surface of the quench-hardened layer.

Further, the hardness of the quench-hardened layer is greater than 50 HRC, preferably 54-62 HRC, more preferably 58 HRC.

Further, the quench-hardened layer extends along the first surface of the moment output part or the first surface of the moment transmission part.

Further, the manual tool is a pliers tool, the pliers head of the pliers tool is the moment output part, an outer surface of a tooth part of the pliers head is the first surface, the tooth part is simultaneously heated by the high-frequency current and the intermediate-frequency current, and then cooled and quenched, thus a quench-hardened layer is formed within a first depth range from the outer surface of the tooth part to the interior of the tooth part and evenly distributed along the outer profile of the tooth part.

Further, the manual tool is a wrench, the wrench comprises a moment output part, a handle for inputting a moment and one or more wedging parts, wherein a first end of the handle has an inner surface, the moment output part is disposed in the inner surface of the first end of the handle, the moment output part has an outer surface, the first surface is the outer surface of the moment output part, the wedging part is disposed between the outer surface of the moment output part and the inner surface of the first end of the handle for preventing the outer surface of the moment output part from rotating in a predetermined direction with respect to the inner surface of the first end of the handle. The outer surface of the moment output part is simultaneously heated by the high-frequency current and the intermediate-frequency current, and then cooled and quenched, thus a quench-hardened layer is formed within a first depth range from the outer surface of the moment output part to the interior of the moment output part, and the quench-hardened layer is formed concentrically with the outer surface of the moment output part and evenly distributed along the outer surface of the moment output part.

Further, the manual tool is a clamp, the clamp includes a first clamping body, a second clamping body and a lever penetrating through the first clamping body and the second clamping body, wherein the first clamping body and the second clamping body can move toward or away from each other on the lever to realize a clamping or expansion function. The lever is the first surface of the moment transmission part, including a first working face and a second working face, the first working face and the second working face are simultaneously heated by the high-frequency current and the intermediate-frequency current, and then cooled and quenched, thus a quench-hardened layer is formed within a first depth range from the first working face to the interior of the lever and within a first depth range from the second working face to the interior of the lever, and the quench-hardened layer is substantially parallel to the first working face and the second working face and evenly distributed along the first working face and the second working face.

Further, the first working face is located opposite to the second working face, and the first clamping body and the second clamping body can move toward or away from each other along the first working face and the second working face.

Further, the manual tool is a wrench having a ratchet ring which is a moment output part, a first surface is the outer surface of the ratchet ring, the outer surface of the ratchet ring is simultaneously heated by the high-frequency current and the intermediate-frequency current, and then cooled and quenched, thus a quench-hardened layer is formed within a first depth range from the outer surface of the ratchet ring to the interior of the ratchet ring, and the quench-hardened layer is formed concentrically with the outer surface of the ratchet ring and evenly distributed along the outer surface of the ratchet ring.

Further, the manual tool is a ratchet screwdriver having a ratchet device, wherein the ratch device is a moment transmission part and comprises a ratchet and a pawl, an outer surface of the ratchet and an outer surface of the pawl are simultaneously heated by the high-frequency current and the intermediate-frequency current, and then cooled and quenched, thus a quench-hardened layer is formed within a first depth range from the outer surface of the ratchet to the interior of the ratchet and within a first depth range from the outer surface of the pawl to the interior of the pawl; the quench-hardened layer on the ratchet is formed concentrically with the outer surface of the ratchet and evenly distributed along the outer surface of the ratchet; and the quench-hardened layer on the pawl is formed concentrically with the outer surface of the pawl and evenly distributed along the outer surface of the pawl.

Further, the ratchet screwdriver further comprises an acceleration planetary gear mechanism including a ring gear, a sun gear and a planetary gear, wherein an outer surface of the ring gear, an outer surface of the sun gear, and an outer surface of the planetary tooth are simultaneously heated by the high-frequency current and the intermediate-frequency current, and then cooled and quenched, thus quench-hardened layer are formed within a first depth range from the respective outer surface of the ring gear, the sun gear, and the planetary gear to the respective interior; the quench-hardened layer on the ring gear is formed concentrically with the outer surface of the ring gear and evenly distributed along the outer surface of the ring gear; the quench-hardened layer on the sun gear is formed concentrically with the outer surface of the sun gear and evenly distributed along the outer surface of the sun gear; and the quench-hardened layer on the planetary gear is formed concentrically with the outer surface of the planetary gear and evenly distributed along the outer surface of the planetary gear.

Compared to conventional manual tools subjected to single-frequency induction quenching, the manual tools subjected to dual-frequency induction quenching of the present invention have better wear resistance.

The technical conception and specific embodiments of the present invention are further described in detail below with reference to the accompanying drawings.

BRIEF DESCRIPTION OF THE DRAWINGS

FIG. 5b is a cross-sectional view of the D-head along the B-B direction in FIG. 5a;

DETAILED DESCRIPTION OF THE PREFERRED EMBODIMENTS

Figure 1:
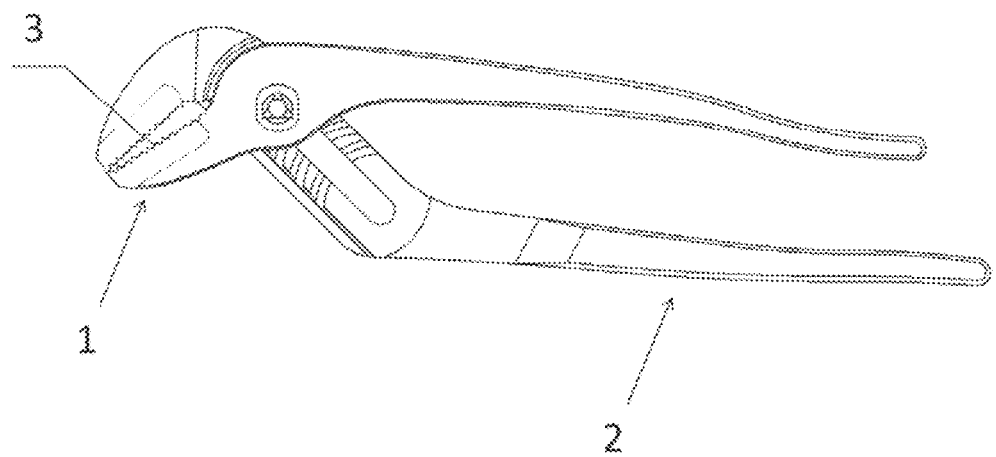
FIG. 1 is a schematic diagram of a water pump pliers in accordance with embodiment 1 of the present invention.

A preferred embodiment of the present invention provides a method for manufacturing a manual tool, comprising the steps of:

providing a metal raw material;

machining and shaping the metal raw material according to the requirements of a manual tool, so that the manual tool (blank state) has a moment output part for directly or indirectly exerting a force on a workpiece or a moment transmission part for transmitting a moment;

performing dual-frequency induction quenching on a first surface of the moment output part or the moment transmission part such that a quench-hardened layer is formed within a first depth range from the first surface of the moment output part to the interior of the moment output part or within a first depth range from the first surface of the moment transmission part to the interior of the moment transmission part, the quench-hardened layer having a hardness higher than that of the body of the moment output part or the moment transmission part, wherein the first depth is 0.3-8.0 mm, preferably 0.6-3.0 mm. Also, a transition zone is formed between the quench-hardened layer and the body of the moment output part. The transition zone has a hardness lower than that of the body of the moment output part and not higher than that of the quench-hardened layer. After the first surface of the moment output part is subjected to dual-frequency induction quenching, the body of the moment output part maintains the original hardness unchanged except for the quench-hardened layer and the transition zone.

After dual-frequency induction quenching, the manual tool is then tempered at a tempering temperature of 160-400° C. for a temperature-holding time of 2-8 h. In a preferred embodiment, after dual-frequency induction quenching, the manual tool is tempered in a heat treatment furnace.

The dual-frequency induction quenching is configured to simultaneously feed or introduce a high-frequency current and a intermediate-frequency current to the same induction coil, the first surface of the moment output part or the first surface of the moment transmission part is simultaneously heated by the high-frequency current and the intermediate-frequency current, and then the moment output part or the moment transmission part is cooled and quenched. Specifically, the first surface of the moment output part or the moment transmission part is heated using an induction heating device that comprises the induction coil. In the induction heating device, the high-frequency current has a frequency range of 100-500 KHz and a power range of 5-1500 KW; the intermediate-frequency current has a frequency range of 0.2-25 KHz and a power range of 5-1500 KW. The medium used for cooling and quenching is quenching oil or PAG water-soluble quenching medium.

In a preferred embodiment of the present invention, the metal raw material is a powder metallurgy material, carbon steel, alloy structural steel, or tool steel raw material. Manual tools are products driven by toothed structures, such as pliers tools (such as water pump pliers, pipe pliers, locking pliers, etc.), wrenches (ratchet wrenches such as silent ratchet wrenches, zero-degree dual-purpose wrenches, etc.), clamps (such as F-clips) or screwdrivers (such as ratchet screwdrivers, acceleration screwdrivers, etc.). The induction heating device used in this embodiment is an induction heating device available from the market or known in the art. The induction heating device includes an induction coil capable of simultaneously feeding the high-frequency current and the intermediate-frequency current.

Another preferred embodiment of the present invention provides a manual tool including at least a moment output part or a moment transmission part. A quench-hardened layer is formed within a first depth range from a first surface of the moment output part to the interior of the moment output part or within a first range from a first surface of the moment transmission part to the interior of the moment transmission part. The formation process of the quench-hardened layer is: the first surface of the moment output part or the moment transmission part is simultaneously heated by feeding or introducing the high-frequency current and the intermediate-frequency current to the same induction coil, and then the moment output part or the moment transmission part is cooled and quenched. The first depth is 0.3-8.0 mm, preferably 0.6-3.0 mm. The quench-hardened layer extends along the first surface of the moment output part. The hardness of the quench-hardened layer is higher than that of the body of the moment output part or the moment transmission part. The hardness of the quench-hardened layer is greater than 50 HRC, preferably 54-62 HRC, more preferably 58 HRC.

A transition zone is formed between the quench-hardened layer and the body of the moment output part or the moment transmission part. The contact face between the transition zone and the quench-hardened layer extends along the surface of the quench-hardened layer. The hardness of the transition zone is lower than that of the quench-hardened layer and not higher than that of the body of the moment output part or the moment transmission part. The depth of the transition zone is not greater than 3.0 mm, preferably not greater than 1.5 mm.

Embodiment 1

Figure 2:
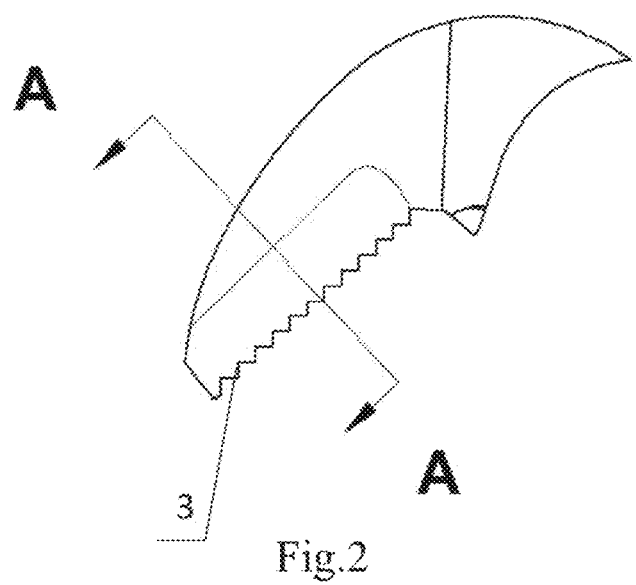
FIG. 2 is a partial enlarged view of FIG. 1.

In this embodiment, the manual tools are pliers tools, such as water pump pliers, pipe pliers, locking pliers and the like. Here, the water pump pliers are taken as an example, but not limited thereto. As shown in FIGS. 1 and 2, the water pump pliers comprises a pliers head 1 and a handle 2, and is made of carbon steel or alloy structural steel. The pliers head 1 is a moment output part. The pliers head 1 has a tooth part 3 for increasing the frictional force with a workpiece when clamping the workpiece. An outer surface of the tooth part 3 of the pliers head 1 is the first surface. The tooth part 3 is heated simultaneously by both a high-frequency current and an intermediate-frequency current. When heated by the high-frequency current, the convex portion of the tooth of the tooth part 3 is heated rapidly, so the temperature is higher. When heated by the intermediate-frequency current, the bottom of the tooth and the shallow area below the bottom are heated rapidly, and the temperature is higher. In this way, the heating temperature of each point on the convex and concave portions of the tooth part 3 and the shallow area below the bottom of the tooth (the first depth range is from the surface of the tooth to the shallow area below the bottom of the tooth) is uniform due to uniform heating. During subsequent cooling and quenching, a quench-hardened layer 4 evenly distributed along the outer profile of the tooth part 3 (see FIG. 3a) is obtained by simultaneously quenching and hardening each point on the concave and convex portions of the tooth part 3 and the shallow area below the bottom of the tooth. The quench-hardened layer 4 enables the water pump pliers of this embodiment to be evenly stressed during subsequent use, increasing the service life of the tool. A buffer transition zone 5 is formed between the quench-hardened layer 4 and the matrix of the water pump pliers (see FIG. 3a). The contact face between the transition zone 5 and the quench-hardened layer 4 extends along the surface of the quench-hardened layer 4, improving the anti-fatigue strength of the tooth part 3 of the tool.

Figure 3A:
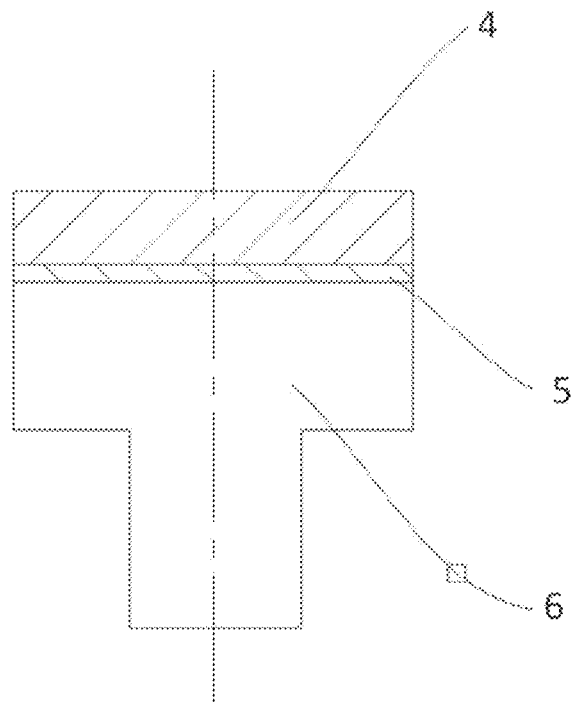
FIG. 3a is a cross-sectional view along the A-A direction in FIG. 2 (heated using dual-frequency current induction)

As shown in FIG. 3a, a cross-sectional view of the pliers head 1 along a top-to-bottom direction AA parallel to the tooth part 3 of the pliers head 1 shows that after dual-frequency induction quenching according to the present embodiment, the outline of the bottom of the quench-hardened layer 4 formed in this section is substantially parallel to the top or bottom of the tooth part 3, and the quench-hardened layer 4 has a uniform depth and evenly distributed along the surface of the whole pliers head 1. The hardness of the quench-hardened layer 4 is higher than that of the body 6 of the pliers head 1.

Figure 3B:
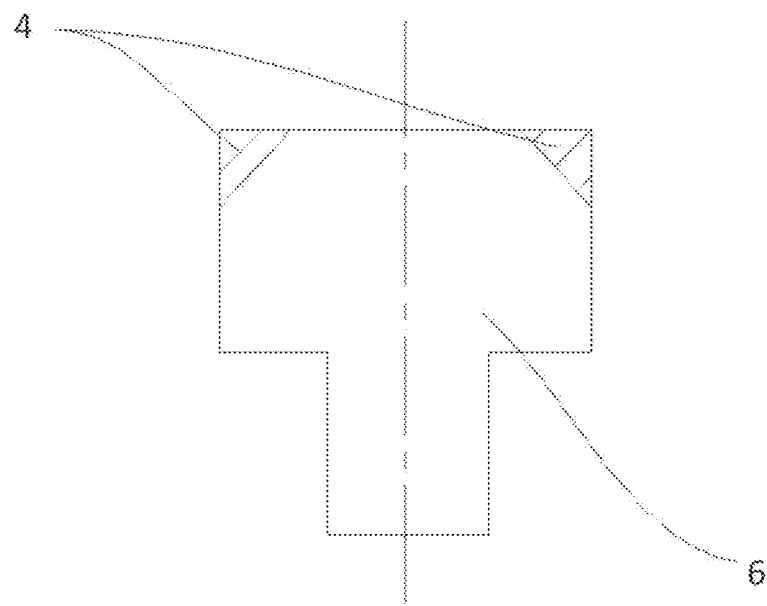
FIG. 3b is a cross-sectional view along the A-A direction in FIG. 2 (heated using high-frequency current induction at a single frequency and for a shorter heating time)

In order to illustrate the advantages of the present embodiment, FIG. 3b shows a case in which the high-frequency induction quenching used for the pliers head 1 in the prior art is a single-frequency induction current, that is, when heated by a high-frequency induction device, only the current at one frequency passes through the induction coil. When the high-frequency heating time is shorter, only the angular portions at two sides of the tooth of the tooth part 3 are heated, quench-hardened, while the middle portion of the tooth is not heated enough, such that after being cooled and quenched, the hardness of the middle portion of the tooth is not enough. In the actual use, the middle portion of the tooth is easy to wear and collapse, so that the tool is scrapped.

Figure 3C:
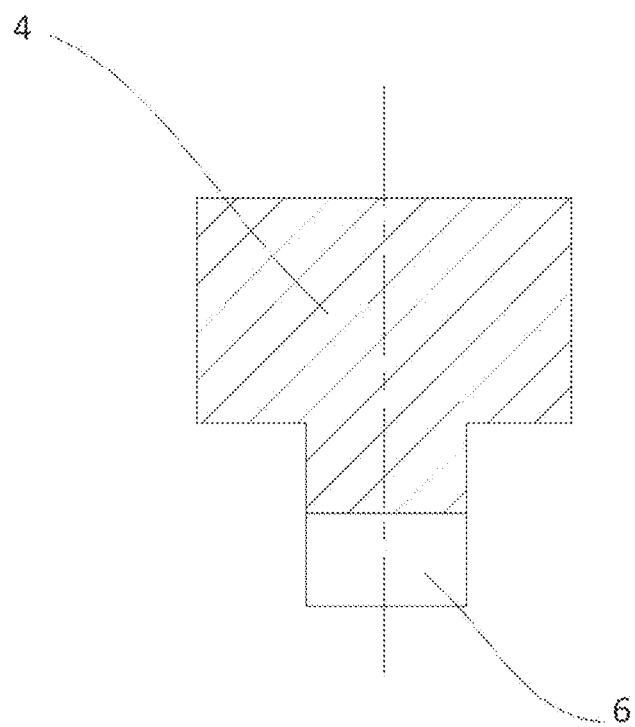
FIG. 3c is a cross-sectional view along the A-A direction in FIG. 2 (heated using high-frequency current induction at a single frequency and for a longer heating time)

FIG. 3c shows a case in the prior art, in which the high frequency current heating time is increased in order to improve the defect of insufficient quenching of the middle portion of the tooth of the tooth part 3 of the pliers head 1, resulting in that most of the area comprising the whole pliers head 1 is heated. In this case, although the surface of the tooth part 3 is quench-hardened, most area of the pliers head 1 below the tooth part 3 is also in a high hardness state, resulting in a high brittleness, thus the pliers head 1 has a high risk of fracture during use.

In this embodiment, the depth of the formed quench-hardened layer 4 is 0.3-8.0 mm as measured from the surface of the tooth part 3 toward the bottom of the tooth part 3. In a preferred embodiment, the depth of the quench-hardened layer 4 is 0.6-3.0 mm. The hardness of the quench-hardened layer 4 formed in this embodiment is greater than 50 HRC. In a preferred embodiment, the hardness of the quench-hardened layer 4 is 54-62 HRC. In a more preferred embodiment, the hardness of the quench-hardened layer 4 is 58

HRC. Between the quench-hardened layer 4 and the matrix material (the body 6 of the pliers head 1), there is a narrow transition zone 5 (see FIG. 3a) which has a hardness lower than that of the quench-hardened layer 4 and not higher than that of the matrix material. The depth of the transition zone 5 is not greater than 3.0 mm. In a preferred embodiment, the depth of the transition zone 5 is not greater than 1.5 mm.

Embodiment 2

Figure 4:
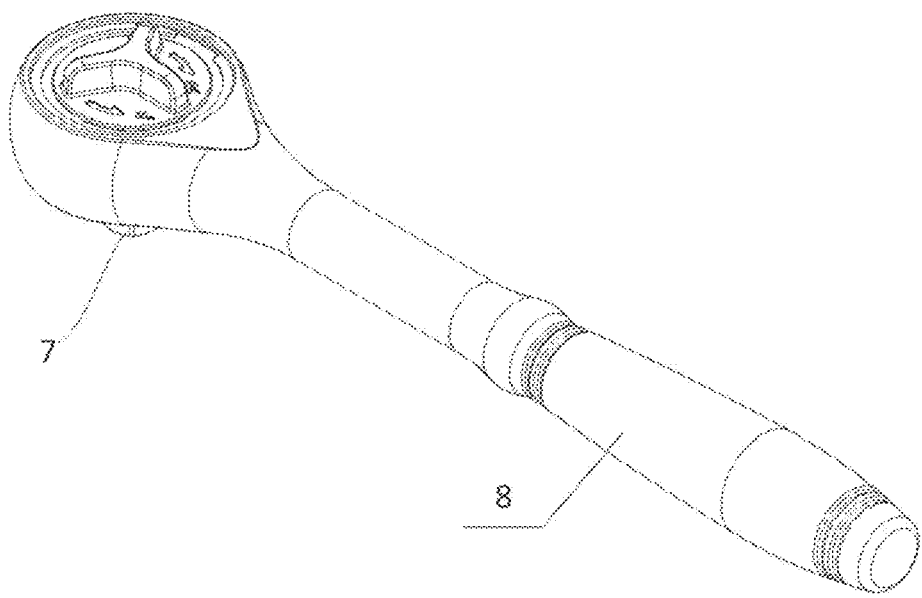
FIG. 4 is a schematic diagram of a silent wheel wrench in accordance with embodiment 2 of the present invention.

The manual tool in this embodiment is a ratchet wrench, and the silent ratchet wrench is taken as an example, but not limited thereto. As shown in FIG. 4, the silent ratchet wrench comprises a moment output part 7 (i.e., a D-head), a handle 8 for inputting a moment and one or more wedging parts (not shown), and is made of alloy structural steel. A first end of the handle 8 has an inner surface and the moment output part 7 is disposed in the inner surface of the first end of the handle 8. The moment output part 7 (a D-head) has an outer surface including a hexagonal working face 11 (located in the upper portion of the D-head) and a quadrangular working face 12 (located in the lower portion of the D-head) (see FIG. 5a). The wedging part is provided between the outer surface of the moment output part 7 and the inner surface of the first end of the handle 8 for preventing the outer surface of the moment output part 7 from rotating in a predetermined direction with respect to the inner surface of the first end of the handle 8. The hexagonal working face 11 of the moment output part 7 (i.e., the D-head) is subjected to dual-frequency induction quenching, that is, both a high-frequency current and an intermediate-frequency current are simultaneously fed to the same induction coil so as to simultaneously heat the hexagonal working face 11 and the shallow area from the hexagonal working face 11 to the interior of the moment output part 7, which are evenly heated and then cooled and quenched. During cooling and quenching, the hexagonal working face 11 and the shallow area from the hexagonal working face 11 to the interior of the moment output part 7 (the first depth range) are simultaneously quenched and hardened, resulting in a quench-hardened layer 9 (see FIG. 5b) which is substantially concentric with the hexagonal working face 11 and evenly distributed along the hexagonal working face 11. This allows the hexagonal working face 11 of the moment output part (D-head) to have a high hardness and high wear resistance while most of the area between the hexagonal working face 11 of the moment output part and the quadrangular working face 12 and the surface of the quadrangular working face 12 maintain a lower hardness and better toughness, thereby increasing the service life of the ratchet wrench.

Figure 5A:
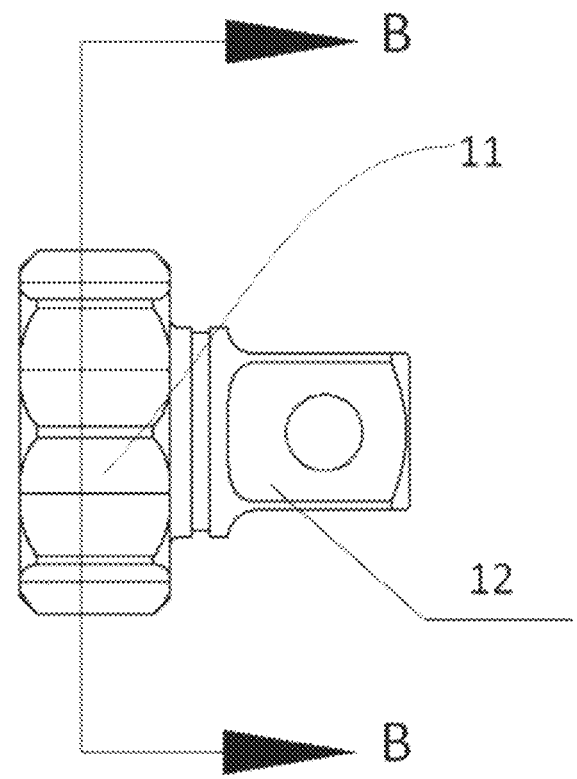
FIG. 5a is a partial enlarged view of the D-head of FIG. 4.
Figure 5B:
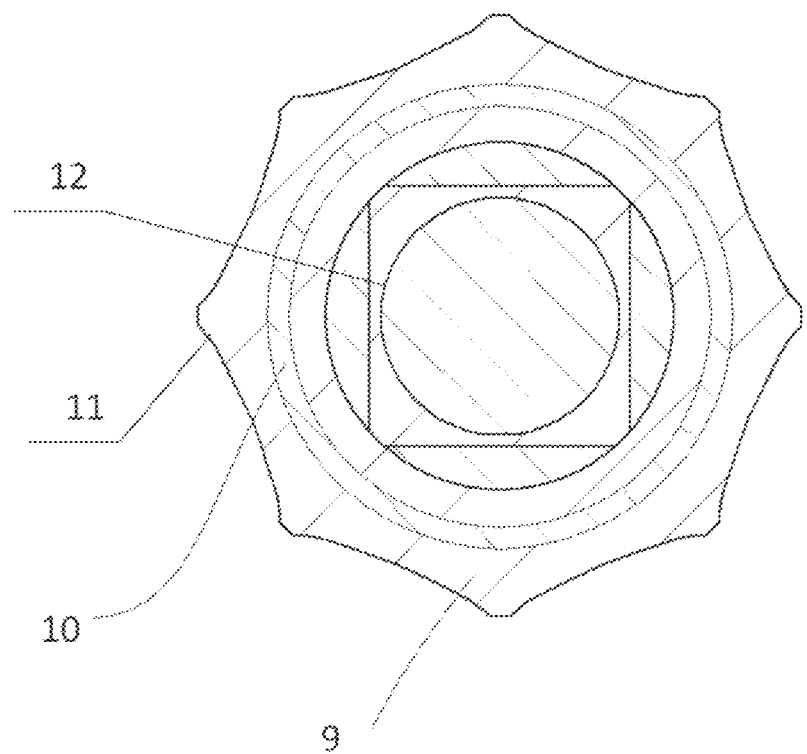

As shown in FIGS. 5a and 5b, the hexagonal head portion is sectioned along the direction B-B perpendicular to the axis of the moment output part 7 of the silent ratchet wrench, the quench-hardened layer 9 formed on this section is substantially concentric with the outer profile of the hexagonal working face 11, and the depth of the quench-hardened layer 9 is uniform and evenly distributed along the entire hexagonal working face 11. The depth of the formed quench-hardened layer 9 is 0.3-8.0 mm as measured from the outer profile of the hexagonal working face 11 to the interior of the moment output part 7. In a preferred embodiment, the depth of the formed quench-hardened layer 9 is 0.6-3.0 mm. The hardness of the quench-hardened layer 9 is higher than that of the body of the moment output part 7.

The hardness of the quench-hardened layer 9 formed in this embodiment is greater than 50 HRC. In a preferred embodiment, the hardness of the quench-hardened layer 9 is 54-62 HRC. In a more preferred embodiment, the hardness of the quench-hardened layer 9 is 58 HRC. There is a narrow transition zone 10 (see FIG. 5b) between the quench-hardened layer 9 and the matrix material (the body of the D-head). The contact face between the transition zone 10 and the quench-hardened layer 9 extends along the surface of the quench-hardened layer 9. The hardness of the transition zone 10 is lower than that of the quench-hardened layer 9 and not higher than that of the matrix material. The transition zone 10 has a depth of not greater than 3.0 mm. In a preferred embodiment, the transition zone 10 has a depth of not greater than 1.5 mm.

Embodiment 3

Figure 6:
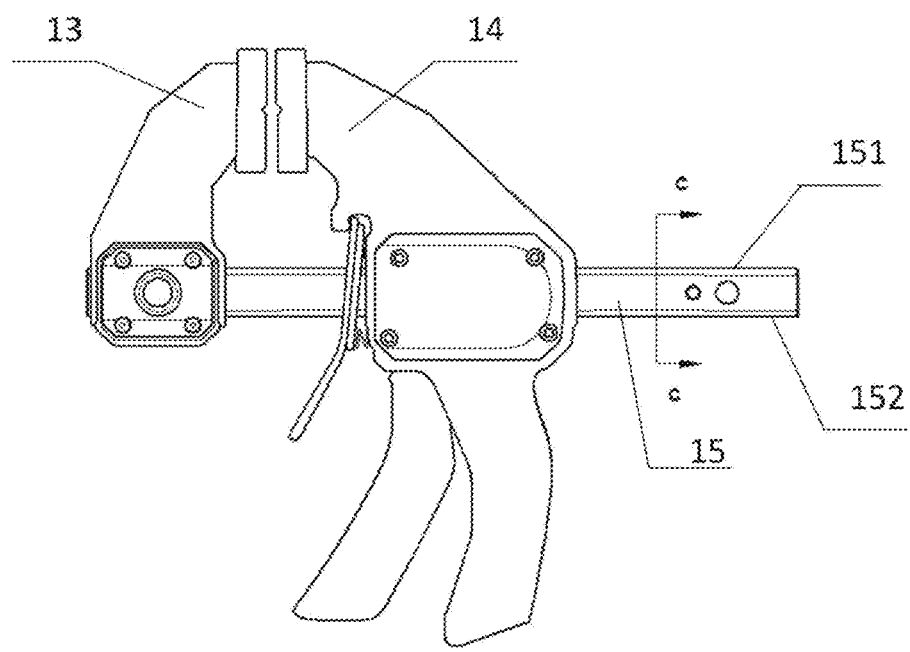
FIG. 6 is a schematic diagram of the F-clip in accordance with embodiment 3 of the present invention.

The manual tool in this embodiment is a clamp, and the F-clip is taken as an example, but not limited thereto. As shown in FIG. 6, the clamp comprises a first clamping body 13, a second clamping body 14 and a lever 15 penetrating through the first clamping body 13 and the second clamping body 14. The first clamping body 13 and the second clamping body 14 can move on the lever 15 toward or away from each other in order to achieve the function of clamping or expansion. The lever 15 of the F-clip is made of carbon steel or alloy structural steel. The lever 15 is a moment transmission part. The first surface comprises a first working face 151 and a second working face 152 of the lever 15. As shown in FIG. 6, the first working face 151 and the second working face 152 are respectively located on the upper side and the lower side of the lever 15. The first clamping body 13 and the second clamping body 14 can move toward or away from each other along the first working face 151 and the second working face 152. Dual-frequency induction quenching is performed on the first working face 151 of the lever 15, that is, a high-frequency current and an intermediate-frequency current are simultaneously fed into the same induction coil. These two currents with different frequencies simultaneously heat the first working face 151 and the second working face 152 and the shallow area below the first working face 151 and above the second working face 152, which are evenly heated and then cooled and quenched. During the cooling and quenching process, the first working face 151 and the second working face 152 of the lever 15 and the shallow area below the first working face 151 and above the second working face 152 are simultaneously quench-hardened so that a hardened layer 16 is formed within a first depth range from the first working face 151 to the interior of the lever 15 (that is, from the first working face 151 to the shallow area below the first working face 151) and within a first depth range from the second working face 152 to the interior of the lever 15 (that is, from the second working face 152 to the shallow area above the second working face 152). The quench-hardened layer 16 is substantially parallel to the first working face 151 and the second working face 152, and evenly distributed along the first working face 151 and the second working face 152. This increases the overall strength of the lever 15 of the F-clip and increases the service life of the F-clip.

Figure 7:
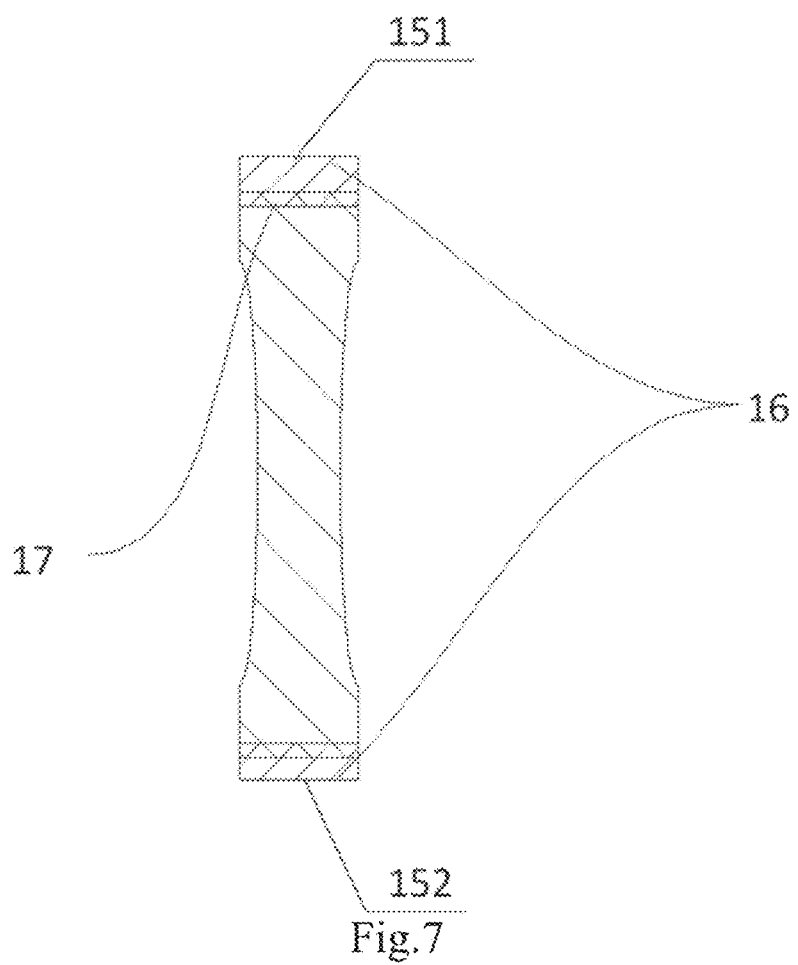
FIG. 7 is a cross-sectional view along the C-C direction in FIG. 6.

As shown in FIG. 7, the lever 15 is sectioned along the direction C-C perpendicular to the axis of the lever 15 of the F-clip, the profile of the quench-hardened layer 16 formed on this section is substantially parallel to the working face of the lever 15, and the quench-hardened layers 16 on the first working face 151 and the second working face 152 of the lever 15 have a uniform depth and evenly distributed over the entire lever 15. The depth of the formed quench-hardened layer 16 is 0.3 to 8.0 mm, which is measured from the surface of the lever 15 to the interior of the lever 15. In a preferred embodiment, the depth of the formed quench-hardened layer 16 is 0.6-3.0 mm. The hardness of the quench-hardened layer 16 is higher than that of the body of the lever 15.

Figure 8:
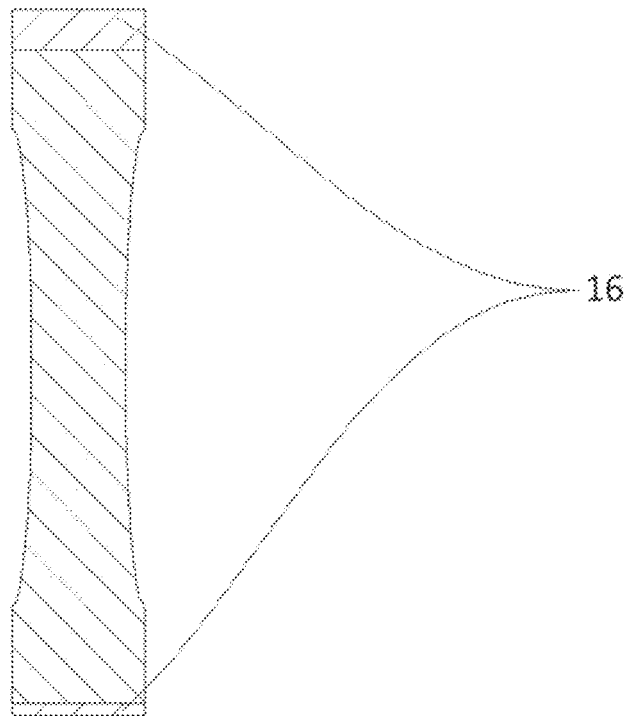
FIG. 8 is a cross-sectional view along the C-C direction in FIG. 6.

In order to illustrate the advantages of the present embodiment, FIG. 8 shows a case of using a single-frequency induction current to perform high-frequency induction quenching on the lever 15 of the F-clip in the prior art. When the heating time is shorter, the depth of the quench-hardened layer 16 formed on the first working face 151 and the second working face 152 of the lever 15 is smaller than the designed depth and the depths of the quench-hardened layers of the first working face 151 and the second working face 152 are greatly different.

The hardness of the quench-hardened layer 16 formed in this embodiment is greater than 50 HRC. In a preferred embodiment, the hardness of the quench-hardened layer 16 is 54-62 HRC. In a more preferred embodiment, the hardness of the quench-hardened layer 16 is 58 HRC. There is a narrow transition zone 17 (see FIG. 7) between the quench-hardened layer 16 and the matrix material (the body of the lever 15). The contact face between the transition zone 17 and the quench-hardened layer 16 extends along the surface of the quench-hardened layer 16. The hardness of the transition zone 17 is lower than that of the quench-hardened layer 16 and not higher than that of the matrix material. The depth of the transition zone 17 is not greater than 3.0 mm. In a preferred embodiment, the depth of the transition zone 17 is not greater than 1.5 mm.

Embodiment 4

Figure 9:
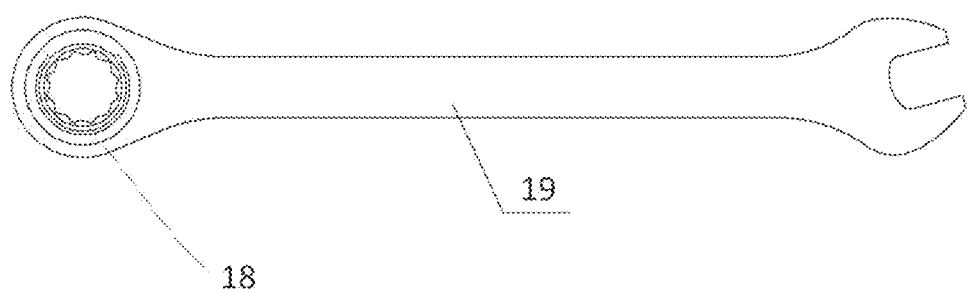
FIG. 9 is a schematic diagram of a zero-degree dual-purpose wrench in accordance with embodiment 4 of the present invention.

The manual tool of the present embodiment is a wrench with a ratchet ring 18, taking a zero-degree dual-purpose wrench as an example, but not limited thereto. As shown in FIG. 9, the zero-degree dual-purpose wrench comprises a ratchet ring 18 and a handle 19. The ratchet ring 18 is located in an inner surface of one end of the handle 19. The moment output part of the zero-degree dual-purpose wrench is the ratchet ring 18 which is made of alloy structural steel, tool steel or bearing steel. The first surface is an outer surface of the ratchet ring 18. The outer surface of the ratchet ring 18 is subjected to dual-frequency induction quenching, in which both a high-frequency current and an intermediate-frequency current are simultaneously fed into the same induction coil to simultaneously heat the outer surface of the ratchet ring 18 and the shallow area below the outer surface, which are heated evenly and subsequently cooled and quenched. During cooling and quenching, the outer surface of the ratchet ring 18 and the shallow area below the outer surface are simultaneously quenched and hardened so that a quench-hardened layer 20 (see FIG. 10) is formed within a first depth range from the outer surface of the ratchet ring 18 to the interior of the ratchet ring 18 (from the outer surface of the ratchet ring 18 to the shallow area below the outer surface). The quench-hardened layer 20 is substantially concentric with the outer surface of the ratchet ring 18 and evenly distributed along the outer surface of the ratchet ring 18. This allows the outer surface of the ratchet ring 18 to maintain both the high hardness and the high abrasion resistance while the inner surface of the ratchet ring 18 to maintain its original lower hardness, and thus the ratchet ring can overall maintain a good toughness without breakage, thereby increasing the service life of the zero-degree dual-purpose wrench during actual use.

Figure 10:
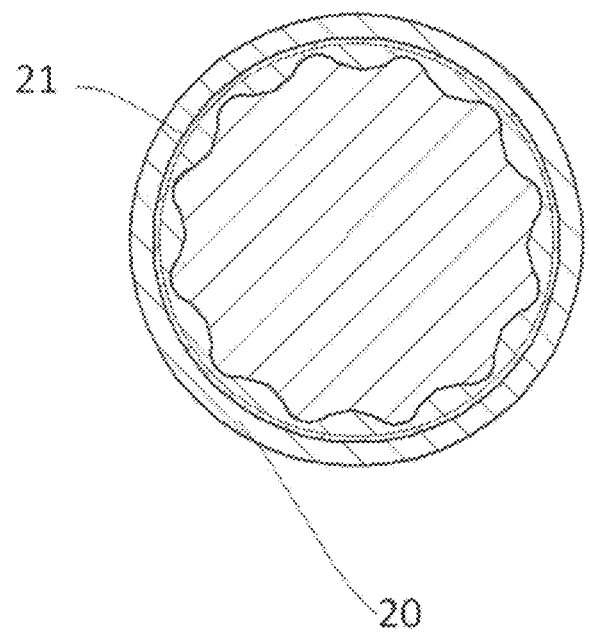
FIG. 10 is a schematic diagram of a section of the ratchet ring in FIG. 9.

FIG. 10 is a cross-sectional view taken in the direction perpendicular to the axis of the ratchet ring 18, the outline of the quench-hardened layer 20 formed on this section is generally concentric with the outer surface of the ratchet ring 18, and the quench-hardened layer 20 throughout the ratchet ring 18 is uniform and evenly distributed throughout the ratchet ring 18. The depth of the formed quench-hardened layer 20 is 0.3-8.0 mm as measured from the outer surface of the ratchet ring 18 toward the interior of the ratchet ring 18. In a preferred embodiment, the depth of the formed quench-hardened layer 20 is 0.6-3.0 mm. The hardness of the quench-hardened layer 20 is higher than that of the body of the ratchet ring 18.

The hardness of the quench-hardened layer 20 formed in this embodiment is greater than 50 HRC. In a preferred embodiment, the hardness of the quench-hardened layer 20 is 54-62 HRC. In a more preferred embodiment, the hardness of the quench-hardened layer 20 is 58 HRC. There is a narrow transition zone 21 (see FIG. 10) between the quench-hardened layer 20 and the matrix material (the body of the ratchet ring 18). The contact face between the transition zone 21 and the quench-hardened layer 20 extends along the surface of the quench-hardened layer 20. The hardness of the transition zone 21 is lower than that of the quench-hardened layer 20 and not higher than that of the matrix material. The depth of the transition zone 21 is not greater than 3.0 mm. In a preferred embodiment, the depth of the transition zone 21 is not greater than 1.5 mm.

Embodiment 5

Figure 11:
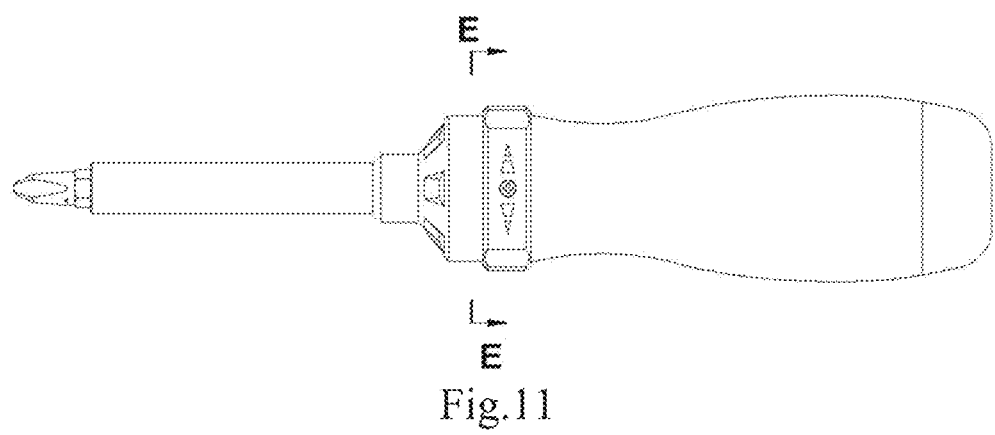
FIG. 11 is a schematic diagram of a ratchet screwdriver in accordance with embodiment 5 of the present invention.
Figure 12:
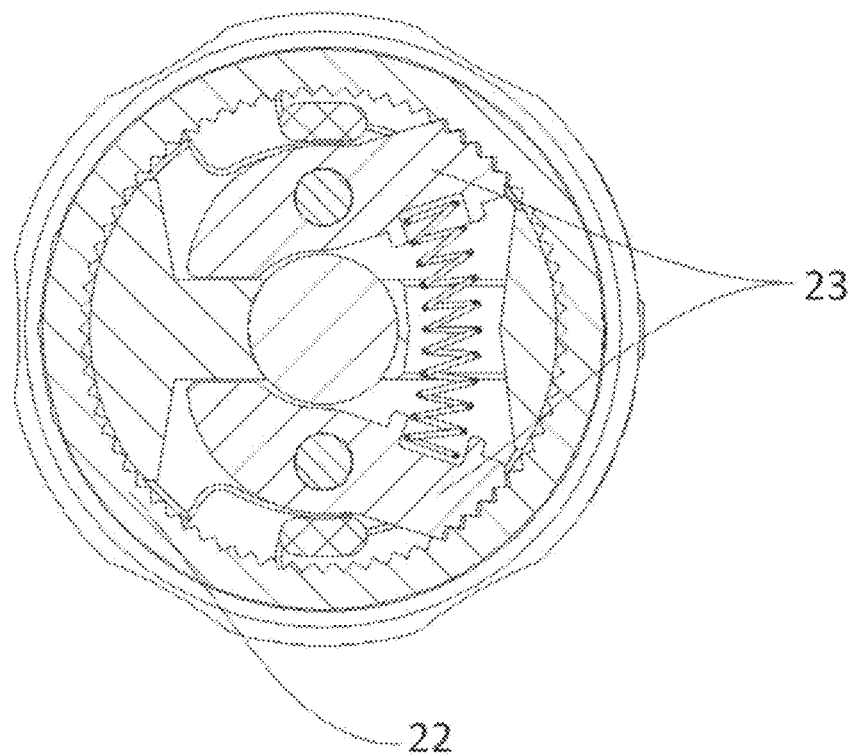
FIG. 12 is a sectional view along the E-E direction in FIG. 11.
Figure 16:
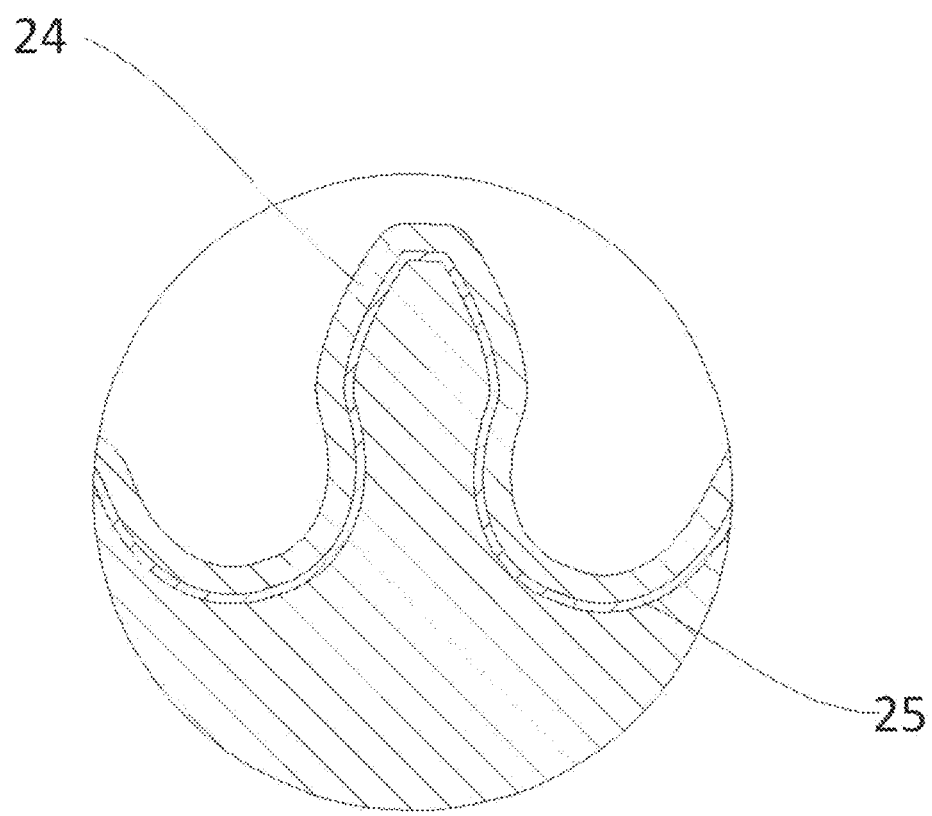
FIG. 16 is a partial cross-sectional view of a tooth of the ratchet and the pawl in accordance with embodiment 5 and a tooth of the ratchet, pawl, sun gear, planet gear, and ring gear in accordance with embodiment 6 of the present invention after dual-frequency induction quenching.
Figure 17:
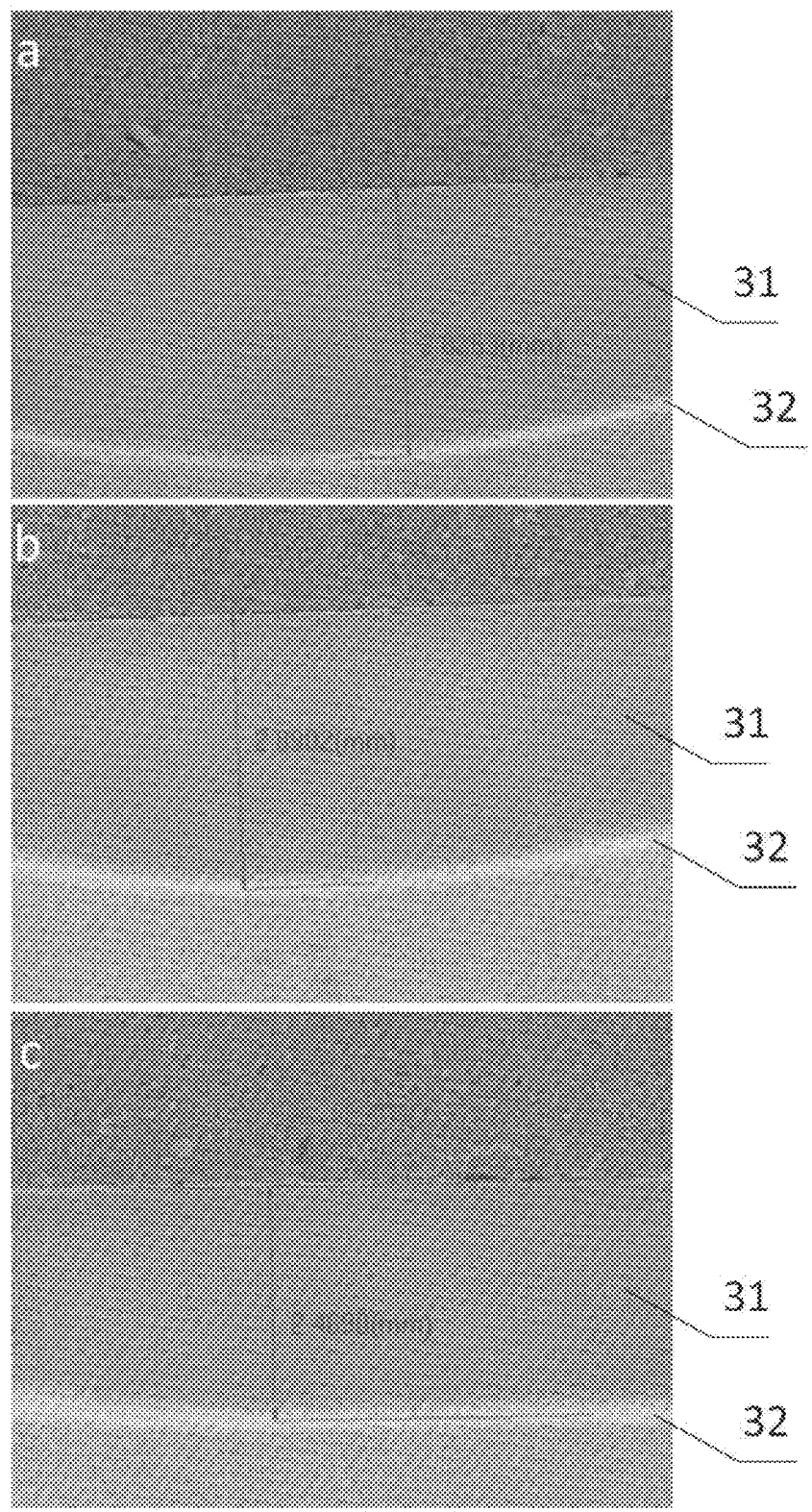
FIG. 17 is metallographical photos showing the quench-hardened layers at the cross sections of the front, middle and rear of the pliers head being inlaid, polished, and corroded after the tooth part of the pliers mouth of a water pump piles is subjected to dual-frequency quenching in embodiment 8.

The manual tool in this embodiment is a ratchet screwdriver (see FIG. 11) having a ratchet device, but not limited thereto. As shown in FIG. 12, the ratchet device comprises a ratchet 22 and a pawl 23 and is made of iron-based powder metallurgical materials or carbon steel, alloy structural steel and tool steel. An outer surface of the ratchet 22 and the shallow area below the outer surface and an outer surface of the pawl 23 and the shallow area below the outer surface are heated by a high-frequency current and an intermediate-frequency current simultaneously and are evenly heated, then cooled and quenched. During the cooling and quenching process, the outer surface of the ratchet 22 and the shallow area below the outer surface and the outer surface of the pawl 23 and the shallow area below the outer surface are simultaneously quenched and hardened, so that a quench-hardened layer 24 (see FIG. 16) is formed within a first depth range from the outer surface of the ratchet 22 to the interior of the ratchet 22 (from the outer surface of the ratchet 22 to the shallow area below the outer surface) and within a first depth range from the outer surface of the pawl 23 to the interior of the pawl 23 (from the outer surface of the pawl 23 to the shallow area below the outer surface). The quench-hardened layer 24 on the ratchet 22 is formed concentrically with the outer surface of the ratchet 22 and evenly distributed along the outer surface of the ratchet 22. The quench-hardened layer 24 on the pawl 23 is formed concentrically with the outer surface of the pawl 23 and evenly distributed along the outer surface of the pawl 23. The hardness of the quench-hardened layer 24 is higher than that of the body of the ratchet 22 and the pawl 23. The interior of the ratchet 22 and the pawl 23 maintains the original lower hardness state, which allows the outer surface of the ratchet 22 and the pawl 23 to keep an excellent wear resistance, but also the internal matrix to maintain a good toughness, thus increasing the service life of the ratchet 22 screwdriver.

As shown in FIG. 12, the ratchet 22 and the pawl 23 are respectively sectioned along the direction E-E perpendicular to the respective axis of the ratchet 22 and the pawl 23, the outline of the quench-hardened layer 24 formed on this section is substantially concentric with the outer surfaces of the ratchet 22 and the pawl 23, and the quench-hardened layer 24 throughout the ratchet 22 and the pawl 23 is uniform and evenly distributed on the ratchet 22 and the pawl 23. The depth of the formed quench-hardened layer 24 is 0.3-8.0 mm as respectively measured from the outer surfaces of the ratchet 22 and the pawl 23 toward the interiors thereof. In a preferred embodiment, the depth of the formed quench-hardened layer 24 is 0.6-3.0 mm.

The hardness of the quench-hardened layer 24 formed in this embodiment is above 50 HRC. In a preferred embodiment, the hardness of the quench-hardened layer 24 is 54-62 HRC. In a more preferred embodiment, the hardness of the quench-hardened layer 24 is 58 HRC. There is a narrow transition zone 25 (see FIG. 16) between the quench-hardened layer 24 and the matrix material (the body of the ratchet 22 and the pawl 23, etc.). The contact face between the transition zone 25 and the quench-hardened layer 25 extends along the surface of the quench-hardened layer 25. The hardness of this transition zone 25 is lower than that of the quench-hardened layer 24 and not higher than that of the matrix material. The depth of the transition zone 25 is not greater than 3.0 mm. In a preferred embodiment, the depth of the transition zone 25 is not greater than 1.5 mm.

Embodiment 6

Figure 13:
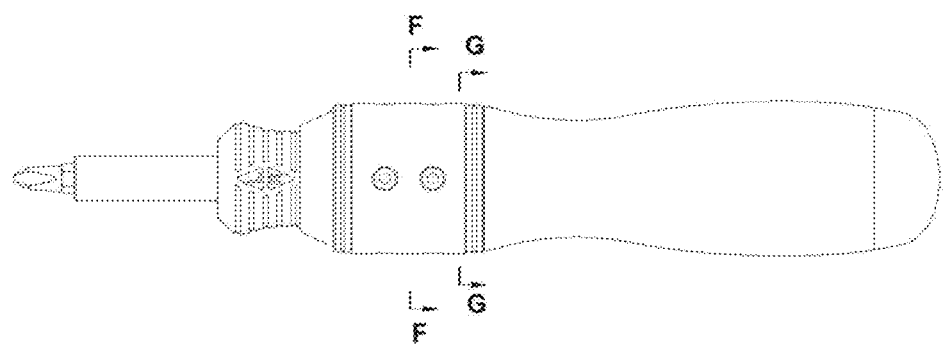
FIG. 13 is a schematic diagram of an acceleration screwdriver in accordance with embodiment 6 of the present invention.

The manual tool of this embodiment is an acceleration screwdriver (see FIG. 13). Different from embodiment 5, the acceleration screwdriver comprises a wheel mechanism of an acceleration planetary gear 28 in addition to the ratchet 22 and the pawl 23. The wheel mechanism of the acceleration planetary gear 28 comprises a ring gear 26, a sun gear 27 and a planetary gear 28. An outer surface of the ratchet 22 and a shallow area below the outer surface, an outer surface of the pawl 23 and a shallow area below the outer surface, an outer surface of the ring gear 26 and a shallow area below the outer surface, an outer surface of the sun gear 27 and a shallow area below the outer surface and an outer surface of the planetary gear 28 and a shallow area below the outer surface are simultaneously heated by a high-frequency current and an intermediate-frequency current and then cooled and quenched. During the cooling and quenching, the outer surface of the ratchet 22 and the shallow area below the outer surface, the outer surface of the pawl 23 and the shallow area below the outer surface, the outer surface of the ring gear 26 and the outer surface of the outer ring, the outer surface of the sun gear 27 and the shallow area below the outer surface and the outer surface of the planetary gear 28 and the shallow area below the outer surface are simultaneously quenched and hardened, so that a quench-hardened layer 24 is formed within a first depth range from the respective outer surface of the ratchet 22, the pawl 23, the ring gear 26, the sun gear 27, and the planetary tooth 28 to the respective interior thereof (from the outer surface of the ratchet 22 to the shallow area below the outer surface, from the outer surface of the pawl 23 to the shallow area below the outer surface, from the outer surface of the ring gear 26 to the shallow area below the outer surface, from the outer surface of the sun gear 27 to the shallow area below the outer surface, from the outer surface of the planetary tooth 28 to the shallow area below the outer surface). The quench-hardened layer 24 on the ratchet 22 is formed concentrically with the outer surface of the ratchet 22 and evenly distributed along the outer surface of the ratchet 22. The quench-hardened layer 24 on the pawl 23 is formed concentrically with the outer surface of the pawl 23 and evenly distributed along the outer surface of the pawl 23. The quench-hardened layer 24 on the ring gear 26 is formed concentrically with the outer surface of the ring gear 26 are evenly distributed along the outer surface of the ring gear 26. The quench-hardened layer 24 on the sun gear 27 is formed concentrically with the outer surface of the sun gear 27 and evenly distributed along the outer surface of the sun gear 27. The quench-hardened layer 24 on the planetary gear 28 is formed concentrically with the outer surface of the planetary gear 28 and evenly distributed along the outer surface of the planetary gear 28. The hardness of the quench-hardened layer 24 is higher than that of the respective body of the ratchet 22, the pawl 23, the ring gear 26, the sun gear 27, and the planetary gear 28. The respective interior of the ratchet 22, the pawl 23, the ring gear 26, the sun gear 27, and the planetary gear 28 maintain their original lower hardness state, which allows the outer surfaces of the ratchet 22, pawl 23, ring gear 26, sun gear 27, planetary gear 28 and the like to maintain both excellent wear resistance and the internal matrix to maintain good toughness, thus increasing the service life of the acceleration screwdriver.

Figure 14:
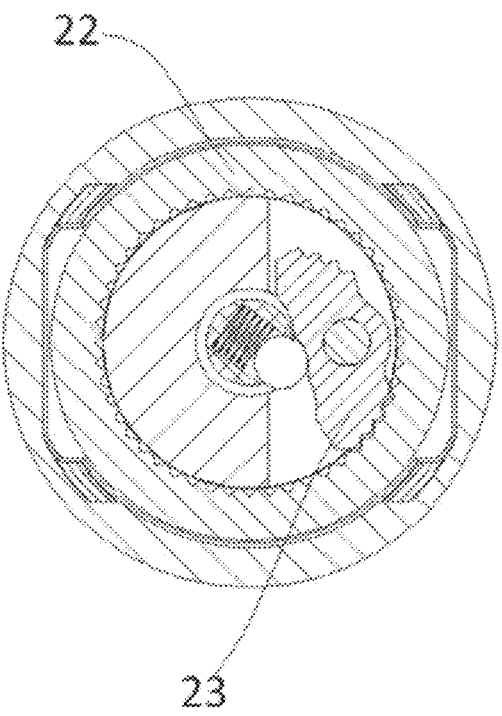
FIG. 14 is a sectional view along the F-F direction in FIG. 13.
Figure 15:
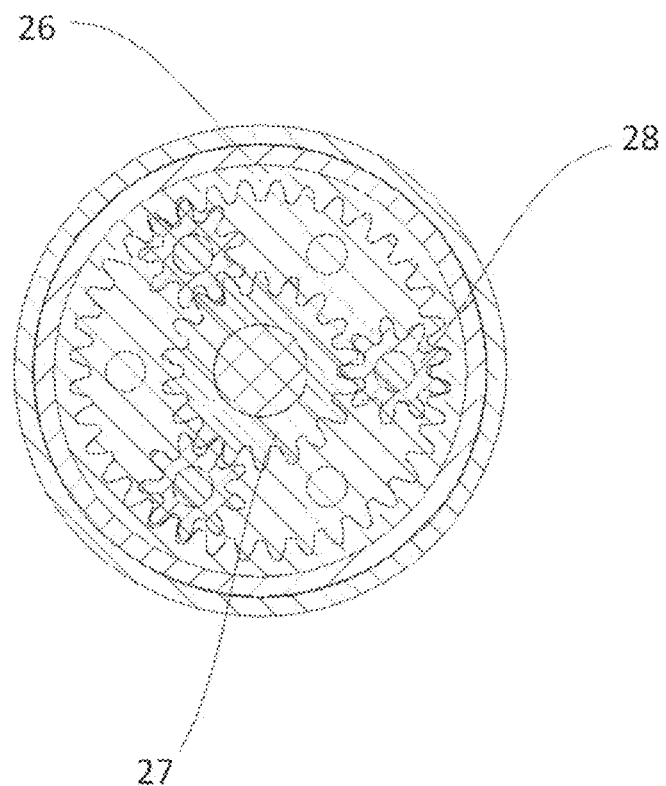
FIG. 15 is a sectional view along the G-G direction in FIG. 13.

As shown in FIG. 14, the ratchet 22 and the pawl 23 are respectively sectioned along the direction F-F perpendicular to the respective axis of the ratchet 22 and the pawl 23. The outline of the quench-hardened layer 24 formed on this section is substantially concentric with the outer surfaces of the ratchet 22 and the pawl 23. The quench-hardened layer 24 throughout the ratchet 22 and the pawl 23 is uniform formed and evenly distributed on the ratchet 22 and the pawl 23. The depth of the formed quench-hardened layer 24 is 0.3-8.0 mm as measured from the outer surfaces of the ratchet 22 and the pawl 23 to the interiors thereof. In a preferred embodiment, the depth of the formed quench-hardened layer 24 is 0.6-3.0 mm. As shown in FIG. 15, the ring gear 26, the sun gear 27, and the planetary gear 28 are respectively sectioned along the direction G-G perpendicular to respective axis of ring gear 26, the sun gear 27, and the planetary gear 28. The outline of the quench-hardened layer 24 formed on this section is substantially concentric with the outer surfaces of the ring gear 26, the sun gear 27, and the planetary gear 28. The quench-hardened layer 24 throughout the ring gear 26, the sun gear 27 and the planetary gear 28 is uniform and evenly distributed throughout the ring gear 26, the sun gear 27, and the planetary gear 28. The depth of the formed quench-hardened layer 24 is 0.3-8.0 mm as respectively measured from the outer surfaces of the ring gear 26, the sun gear 27, and the planetary gear 28 to the interiors thereof. In the preferred embodiment, the depth of the formed quench-hardened layer 24 is 0.6-3.0 mm.

The hardness of the quench-hardened layer 24 formed in this embodiment is greater than 50 HRC. In a preferred embodiment, the hardness of the quench-hardened layer 24 is 54-62 HRC. In a more preferred embodiment, the hardness of the quench-hardened layer 24 is 58 HRC. There is a narrow transition zone 25 (see FIG. 16) between the quench-hardened layer 24 and the matrix material (the ratchet 22, pawl 23, ring gear 26, sun gear 27, planetary tooth 28, etc.). The contact face between the transition zone 25 and the quench-hardened layer 25 extends along the surface of the quench-hardened layer 25. The hardness of this transition zone 25 is lower than that of the quench-hardened layer 24 and not higher than that of the matrix material. The depth of the transition zone 25 is not greater than 3.0 mm. In a preferred embodiment, the depth of the transition zone 25 is not greater than 1.5 mm.

Embodiment 7

As a comparative example, the following similar products well-known in the industry are selected: water pump pliers from Manufacturer 1, water pump pliers from Manufacturer 2, and water pump pliers from Manufacturer 3 and the dual-frequency quenched water pump pliers according to the present application as samples for clamping-wrenching test. The dual-frequency water pump pliers are processed according to dual-frequency induction quenching by using the steps of the above manufacturing method of the present invention, while the other three types of water pump pliers are subjected to conventional single-frequency induction heating quenching, then all followed by clamping-wrenching test. After clamping a round bar (the moment is 120 N·M), the water pump pliers from Manufacturer 1 are significantly worn, the water pump pliers from Manufacturer 2 and the dual-frequency water pump pliers of the present application are not worn, the water pump pliers from Manufacturer 3 are lightly worn. After clamping a 25 mm hexagonal workpiece, six teeth of the water pump pliers from Manufacturer 1 are significantly collapsed, one tooth of the water pump pliers from Manufacturer 2 is significantly collapsed, three teeth of the water pump pliers from Manufacturer 3 are slightly collapsed, and one tooth of the dual-frequency water pump pliers 1 of the present application is slightly collapsed. After clamping and wrenching the same galvanized pipe 50 times, the water pump pliers from Manufacturer 1 are severely worn, the water pump pliers from Manufacturer 2 and the water pump pliers from Manufacturer 3 are significantly worn, and the dual-frequency water pump pliers of the present application are slightly worn. It can be seen from the comparison with conventional single-frequency induction quenched pliers teeth, the wear resistance of the pliers teeth quenched using a dual-frequency induction heating device is improved.

Embodiment 8

As another comparative example, a 10 inch straight-pattern water pump pliers is selected, and a, b and c in the drawing are metallographical photos showing the quench-hardened layers at the cross sections of the front, middle and rear of the pliers head being inlaid, polished, and corroded after the tooth part of the pliers head of the water pump piles is subjected to dual-frequency quenching, wherein the dual-frequency zone structure is needle-shaped martensite structure with a slight decarburization on the surface near the tooth part, and the high-frequency quenching depth (the depth of the quench-hardened layer) is 2.83 mm, 2.89 mm and 2.47 mm respectively. The quench-hardened layer of tooth part of the pliers head is evenly distributed and is not easy to produce intermediate collapse after being subjected to a force, increasing the bite force of the pliers mouth. The transition zone is smaller, and the matrix zone structure is a tempered troostite structure.

The above embodiments describe several specific implementation modes of the present invention in detail. It should be understood that those skilled in the art to which the present invention pertains can make many modifications and changes to the technical conception of the present invention after understanding the technical conception, the specific embodiments and the effects of the present invention. Therefore, based on the above technical conception of the present invention, the technical solutions obtained through logical analysis, inference or limited experiments, in combination with the prior art should all fall within the scope of the claims of the present invention.

The invention claimed is:

1. A manual tool, comprising at least a moment output part, wherein
    a quench-hardened layer is formed within a first depth from a first surface of the moment output part to an interior of the moment output part, and
    a formation process of the quench-hardened layer is: the first surface of the moment output part being simultaneously heated by a high-frequency current and an intermediate-frequency current fed or introduced to a same induction coil, and then the moment output part being cooled and quenched;
    wherein the manual tool is a pliers tool, a pliers head of the pliers tool is the moment output member, an outer surface of a tooth part of the pliers head is the first surface, only the tooth part is simultaneously heated by the high-frequency current and the intermediate-frequency current, and then cooled and quenched, the quench-hardened layer is formed within a first depth range from the outer surface of the tooth part to an interior of the tooth part and evenly distributed along an outer profile of the tooth part;
    wherein the first depth is 0.3 to 8.0 mm.

2. The manual tool according to claim 1, wherein the hardness of the quench-hardened layer is higher than that of a body of the moment output part.

3. The manual tool according to claim 1, wherein a transition zone is formed between the quench-hardened layer and a body of the moment output part, and a hardness of the transition zone is lower than that of the quench-hardened layer and not higher than that of the body of the moment output part;
    wherein a contact face between the transition zone and the quench-hardened layer extends along the surface of the quench-hardened layer.

4. The manual tool according to claim 3, wherein the depth of the transition zone is not greater than 3.0 mm.

5. The manual tool according to claim 1, wherein the hardness of the quench-hardened layer is greater than 50 HRC.

6. The manual tool according to claim 1, wherein the quench-hardened layer extends along the first surface of the moment output part.

* * * * *